United States Patent [19]

Chen et al.

[11] 4,347,541
[45] Aug. 31, 1982

[54] CIRCUIT BREAKER

[75] Inventors: Wen T. Chen, West Newton; Vincent C. Oxley, Wayland, both of Mass.

[73] Assignee: GTE Laboratories Incorporated, Waltham, Mass.

[21] Appl. No.: 225,067

[22] Filed: Jan. 14, 1981

[51] Int. Cl.³ .............................................. H02H 9/08
[52] U.S. Cl. ......................................... 361/50; 361/96; 361/97; 361/105
[58] Field of Search ..................... 361/102, 95, 96, 97, 361/93, 105, 47, 50

[56] References Cited

U.S. PATENT DOCUMENTS

| | | | |
|---|---|---|---|
| 3,165,670 | 1/1965 | Baude | 361/105 X |
| 3,317,791 | 5/1967 | Price et al. | 361/93 X |
| 4,038,695 | 7/1977 | DePuy | 361/96 |
| 4,060,844 | 11/1977 | Davis et al. | 361/96 |
| 4,149,210 | 4/1979 | Wilson | 361/96 X |
| 4,259,706 | 3/1981 | Zocholl | 361/96 |

Primary Examiner—Reinhard J. Eisenzopf
Attorney, Agent, or Firm—Fred Fisher

[57] ABSTRACT

A circuit breaker, having a latching mechanism and a solenoid senses current through a circuit. The sensed current is converted to a proportional voltage. A current rating plug and receptacle system, responsive thereto, provides a standardized voltage. The proportional voltage is applied across a resistor in series with parallel connected permanent shunt resistor and replaceable plug resistor. The standardized voltage is obtained across the parallel connection. A peak detector provides an approximate true peak value voltage of the standardized voltage. An instantaneous trip circuit, a ground fault detector, and both short term and long term delay circuits provide trip signals upon certain conditions. Upon the presence of any trip signal, an OR circuit provides a control signal to gate an SCR having a thermal switch coupled across its anode and cathode. A supply voltage is applied across a serial connection of the anode, the cathode, and the solenoid.

5 Claims, 3 Drawing Figures

CIRCUIT BREAKER

BACKGROUND OF THE INVENTION

1. Field of the Invention

This invention relates to improved circuit breakers and, in particular, to new and improved solid state trip units for circuit breakers. Accordingly, it is a general object of this invention to provide new and improved devices of such character.

2. Background of the Invention

The traditional approach to sensing electrical overloads by a circuit breaker has been through a combination of thermal and magnetic action. Current, which passes through the circuit breaker, is caused to flow through a composite material of two or more layers of metal with controlled expansion and resistance, such material being referred to as bimetal or trimetal. Such current causes heating of the bimetal or trimetal at a rate given by the power dissipated, expressed as $I^2R$. Upon heating, the composite material deflects due to the different expansion rates of its constituent layers. Such deflection produces the necessary mechanical force to trip the circuit breaker. When a large overload current is drawn through the circuit breaker, magnetic forces, generated by the load current, are sufficient to attract a ferromagnetic armature, much in the manner of a relay closing, to provide mechanical force to trip the breaker.

The foregoing combination of a dissipated powertime relationship ($I^2Rt$) has proven effective to protect building wiring for moderate overloads, and the magnetic trip assures much more rapid disconnection of large overloads. Though it is sometimes referred to as "instantaneous" trip, this is not truly accurate. Electronic means for sensing and control have been developed in the prior art which are inexpensive, which offer additional time classification such as short term, and which offer field adjustability of sensitivity settings.

Disadvantageously, some of the electronic trip units of the prior art do not provide the desired $I^2t$ powertime characteristic, and have possible circuit drift characteristics which could result in inaccurate or false tripping performance.

Various prior art electronic sensing systems utilized analog means for determining tripping time. Current squared time dependence was achieved by gating one or more resistance-capacitance networks with different time constants as a function of the current signal amplitude, and charging a fixed capacitor until it reached some fixed amplitude. Disadvantageously, even beyond the complexity of such multi-RC network approach, minor shifts in component values caused serious shifts in trip timing, resulting in possible damage due to not tripping soon enough or in nuisance from tripping too soon.

SUMMARY OF THE INVENTION

Another object of this invention is to provide for a new and improved industrial circuit breaker having current sensing, signal processing circuits, and a tripping circuit for better, more reliable system coordination.

Yet another object of this invention is to provide for a new and improved trip unit for an electrical circuit breaker which can provide for an exact $I^2t$ long-term characteristic, a flexible, highly accurate short-term characteristic, and a rapid "instantaneous" trip, together with fail-safe over-temperature protection.

Still yet another object of this invention is to provide for a new and improved circuit breaker having an electronic trip unit therein, which utilizes a hybrid digital approach for providing high accuracy, and which requires fewer parts, and thus better reliability and lower cost, than similar devices of the prior art.

In accordance with one embodiment of the invention, a circuit breaker, having a latching mechanism for opening a pair of breaker contacts and a solenoid for releasing the mechanism in an event of an electrical overload, includes means for sensing current through a circuit subject to interruption by the breaker in the event of an overload. Means convert the sensed current to a voltage proportional thereto. Means detect an excess of the proportional voltage over a predetermined voltage. The excess voltage is squared. Voltage controlled oscillator means, responsive to the squared excess voltage, provide signals during a presence of the excess voltage. The signals are counted. At a predetermined count, the solenoid is actuated.

In yet another embodiment of the invention, a circuit breaker, having a latching mechanism for opening a pair of breaker contacts and a solenoid for releasing the mechanism in an event of an electrical overload, includes means for sensing current through a circuit subject to interruption by the breaker in the event of an overload. Means convert the sensed current to a voltage proportional thereto. Means responsive to a standardized voltage provide a trip signal upon certain magnitude and duration conditions. Means responsive to the trip signal actuate the solenoid. A current rating plug and receptacle system, responsive to the proportional voltage, provide the standardized voltage therefrom. The embodiment further includes a first resistor in series with a parallel connection of a permanent shunt resistor and a replaceable plug resistor. The proportional voltage is applied across the first resistor and the parallel connection. The standardized voltage is provided across the parallel connection. In accordance with certain features of the invention, the current rating of the circuit breaker can be changeable by replacing the replaceable plug resistor with a different valued replaceable plug resistor. When the rating plug is removed, not firmly engaged with the shunt resistor, or damaged to cause an open circuit, the current rating of the breaker is reduced to its lowest value.

In another embodiment of the invention, a circuit breaker, having a latching mechanism for opening a pair of breaker contacts and a solenoid for releasing the mechanism in an event of an electrical overload, includes means for sensing current through a circuit subject to interruption by the breaker in the event of an overload. Means convert the sensed current to a voltage proportional thereto. A current rating plug and receptacle system, responsive to the proportional voltage, provide a standardized voltage therefrom. The proportional voltage is applied across a first resistor in series with a parallel connection of a permanent shunt resistor and a replaceable plug resistor. The standardized voltage is provided across the parallel connection. A peak detector is coupled to receive the standardized voltage for providing a voltage which approximates a true peak value of the standardized voltage. Instantaneous trip circuit means, including threshold detection means, compare the approximate peak value voltage with a preset threshold value. When the approximate peak value voltage equals or exceeds the preset threshold value, a trip signal is provided. Long term delay means includes squaring circuit means coupled to square the approximate peak value voltage from the peak detector. The comparator means is coupled to compare the squared approximate peak value voltage with a reference voltage. A voltage controlled oscillator, coupled to the comparator means, is responsive to the signal applied thereto when the squared approximate peak value voltage exceeds the reference voltage. A pulse counter is coupled to the voltage controlled oscillator for providing a trip signal therefrom when the pulse counter achieves a predetermined count. The pulse counter is reset when the squared approximate peak value voltage ceases to exceed the reference voltage. Short term delay circuit means includes comparator means coupled to compare the approximate peak value voltage with a reference voltage. A voltage controlled oscillator is coupled to the short term delay comparator means responsive to a signal applied to the short term delay voltage controlled oscillator when the approximate peak value voltage exceeds the short term delay reference voltage. A pulse counter is coupled to the short term delay voltage controlled oscillator for providing a trip signal therefrom when the short term delay pulse counter achieves a predetermined count. The short term delay pulse counter is reset when the approximate peak value voltage ceases to exceed the reference voltage. An OR circuit provides a control signal upon the presence of any trip signal applied thereto. A solid state circuit couples the solenoid to a power source, the solid state circuit being actuated by the control signal. In accordance with certain features of the invention, the circuit breaker further includes means responsive to the current sensing means for detecting a ground fault condition, and, in such event, providing a trip signal therefrom. The circuit breaker can further include a thermal switch coupled across the solid state circuit.

In accordance with still yet another embodiment of the invention, a circuit breaker, having a latching mechanism for opening a pair of breaker contacts and a solenoid for releasing the mechanism in an event of an electrical overload, includes means for sensing current through a circuit subject to interruption by the breaker in the event of an overload. Means convert the sensed current to a voltage proportional thereto, and provide a supply voltage. A current rating plug and receptacle system, responsive to the proportional voltage, provide a standardized voltage therefrom. The proportional voltage is applied across a first resistor in series with a parallel connection of a permanent shunt resistor and a replaceable plug resistor. The standardized voltage is provided across the parallel connection. A peak detector is coupled to receive the standardized voltage for providing a voltage which approximates a true peak value of the standardized voltage. Instantaneous trip circuit means, including threshold detection means, compare the approximate peak value voltage with a preset threshold value and, when the approximate peak value voltage equals or exceeds the preset threshold value, provides a trip signal therefrom. Long term delay circuit means includes squaring circuit means coupled to square the approximate peak value voltage from the peak detector. It further includes comparator means coupled to compare the squared approximate peak value voltage with a reference voltage. A voltage controlled oscillator, coupled to the comparator means, is responsive to a signal applied thereto when the squared approximate peak value voltage exceeds the reference voltage. A pulse counter, coupled to the voltage controlled oscillator, provides a trip signal therefrom upon achieving a predetermined count. The pulse counter is reset when the squared approximate peak value voltage ceases to exceed the reference voltage. Short term delay circuit means includes comparator means coupled to compare the approximate peak value voltage with a reference voltage. A voltage controlled oscillator, coupled to the short term comparator means, is responsive to a signal applied to the short term delay, voltage controlled oscillator when the approximate peak value voltage exceeds the short term delay reference voltage. It further includes a pulse counter coupled to the voltage controlled oscillator for providing a trip signal therefrom when the pulse counter achieves a predetermined count. The pulse counter is reset when the approximate peak value voltage ceases to exceed the reference voltage. Means are responsive to the current sensing means for detecting a ground fault condition, and, in such event, providing a trip signal therefrom. An OR circuit provides a control signal upon the presence of any trip signal applied thereto. A thermal switch is coupled across the anode and the cathode of a silicon controlled rectifier whose gate is coupled to receive the control signal. The supply voltage is applied across a series connection of the anode, the cathode, and the solenoid.

BRIEF DESCRIPTION OF THE DRAWINGS

Other objects, advantages, and features of this invention, together with its construction and mode of operation, will become more apparent from the following description, when read in conjunction with the accompanying drawing, in which.

DESCRIPTION OF A PREFERRED EMBODIMENT

Figure 1:
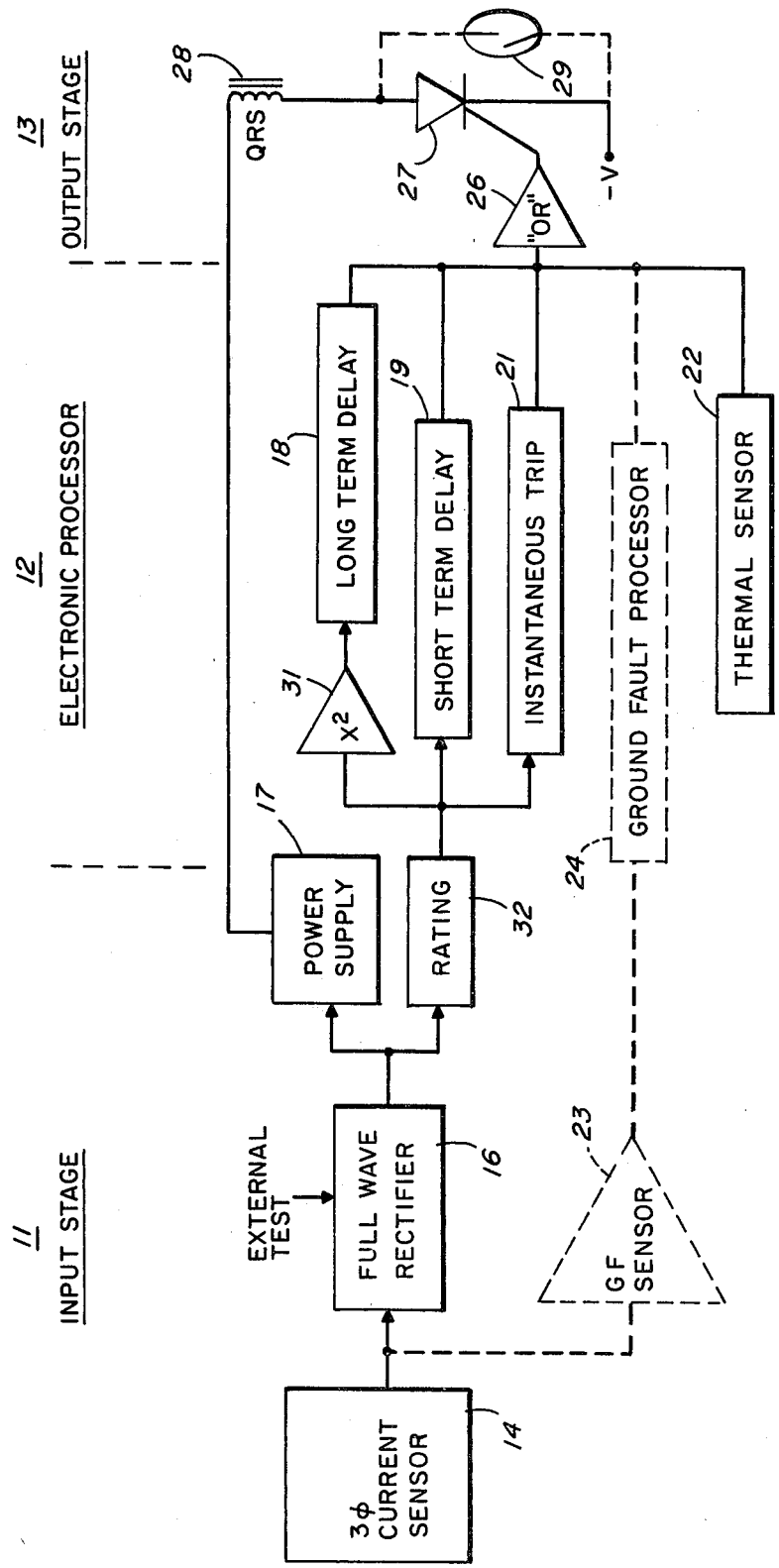
FIG. 1 is a block diagram of one embodiment of this invention, with a portion shown in dotted outline being optional additives thereto.

Referring to FIG. 1, there is illustrated a block diagram of a solid state trip unit for a three-phase circuit breaker including three (3) major portions: an input stage 11, an electronic processor 12, and an output stage 13. The input stage 11 includes three (3) single phase current transformers 14, one current transformer for each circuit breaker pole, followed by a full wave rectifier 16. It is understood, however, that, though a three (3) pole design is described, the invention applies with equal force to any number of poles. The rectified electrical energy not only provides a replica of the current flowing in the breaker to enable sensing overloads, but is also used to provide a power supply 17 for the entire electronics system. The electronic processor 12 is the control center of the solid state trip unit and includes a long-term delay 18, a short term delay 19, an instantaneous trip 21, and thermal sensor 22 sections. Optionally, as indicated in dotted line format, ground fault sensing and control can be implemented by way of a ground fault sensor 23 coupled to the output of the three (3) phase current sensor 14 which is coupled to a ground fault processor 24. The output stage 13 includes an OR gate 26 coupled to receive the outputs of the long term delay 18, the short term delay 19, the instantaneous trip 21, the thermal sensor 22, and the ground fault processor 24. The output of the OR gate 26 is coupled to a gate of a silicon controlled rectifier 27 whose cathode is coupled to a point of reference, such as the negative supply bus, and whose anode is coupled through a quick response solenoid 28 to the power supply 17. Optionally, a secondary thermal sensor 29 can be coupled across the anode and the cathode of the silicon controlled rectifier 27. The long term delay 18 is coupled to receive a squared output representation of the current by a squaring circuit 31. The full wave rectifier 16 is coupled through a rating circuit 32 (as will be more apparent hereinafter) which is coupled to the squaring circuit 31, the short term delay 19 and the instantaneous trip 21. When a trip signal is received by the OR gate 26, from any of the sensing sections in the electronic processor 12, the silicon controlled rectifier 27 is turned on, energizing the quick response solenoid 28 to interrupt the load current.

Figure 2:
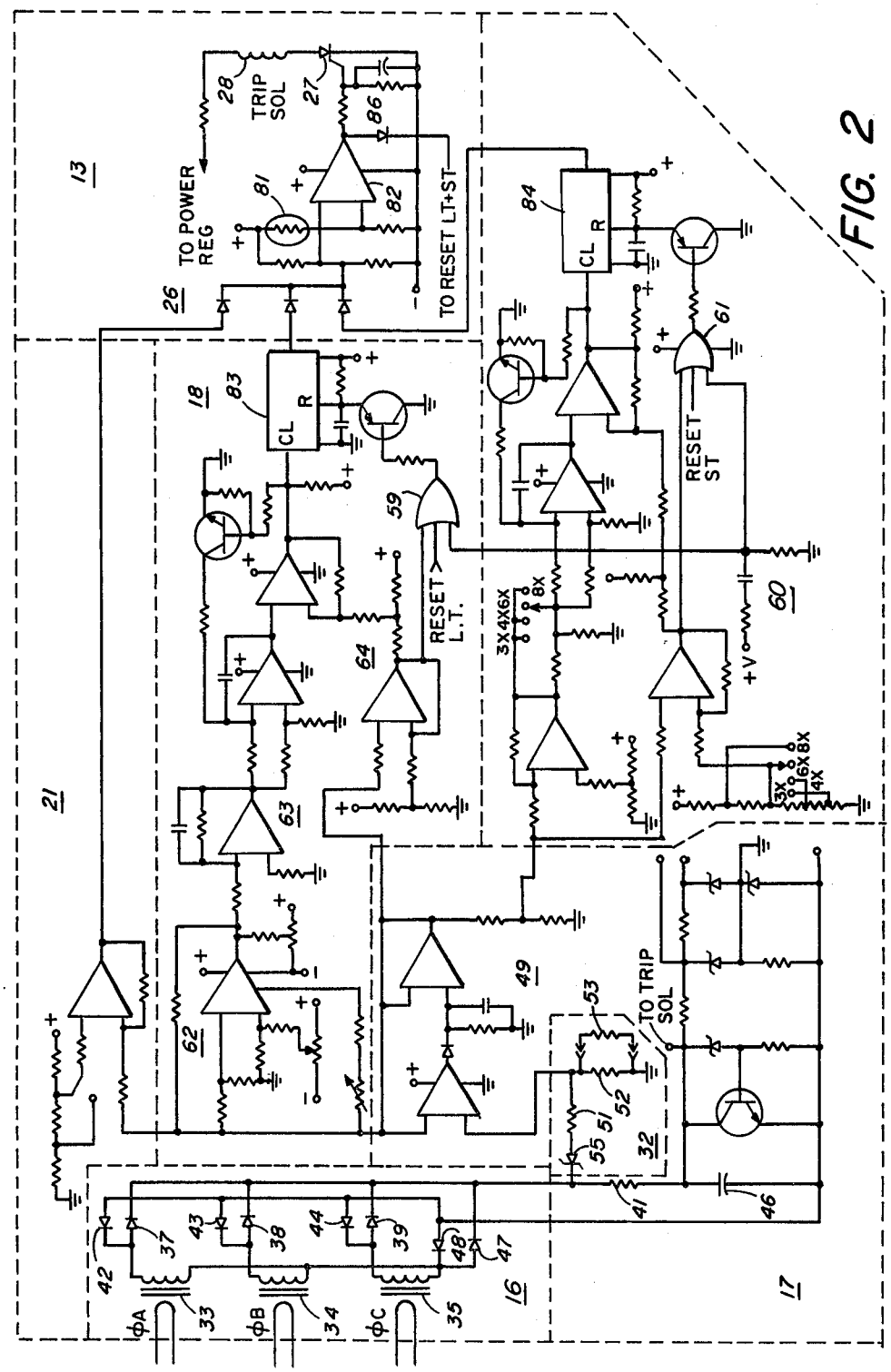
FIG. 2 is a more specific circuit diagram of an embodiment of this invention, with various functional elements being enclosed in dotted line.
Figure 3:
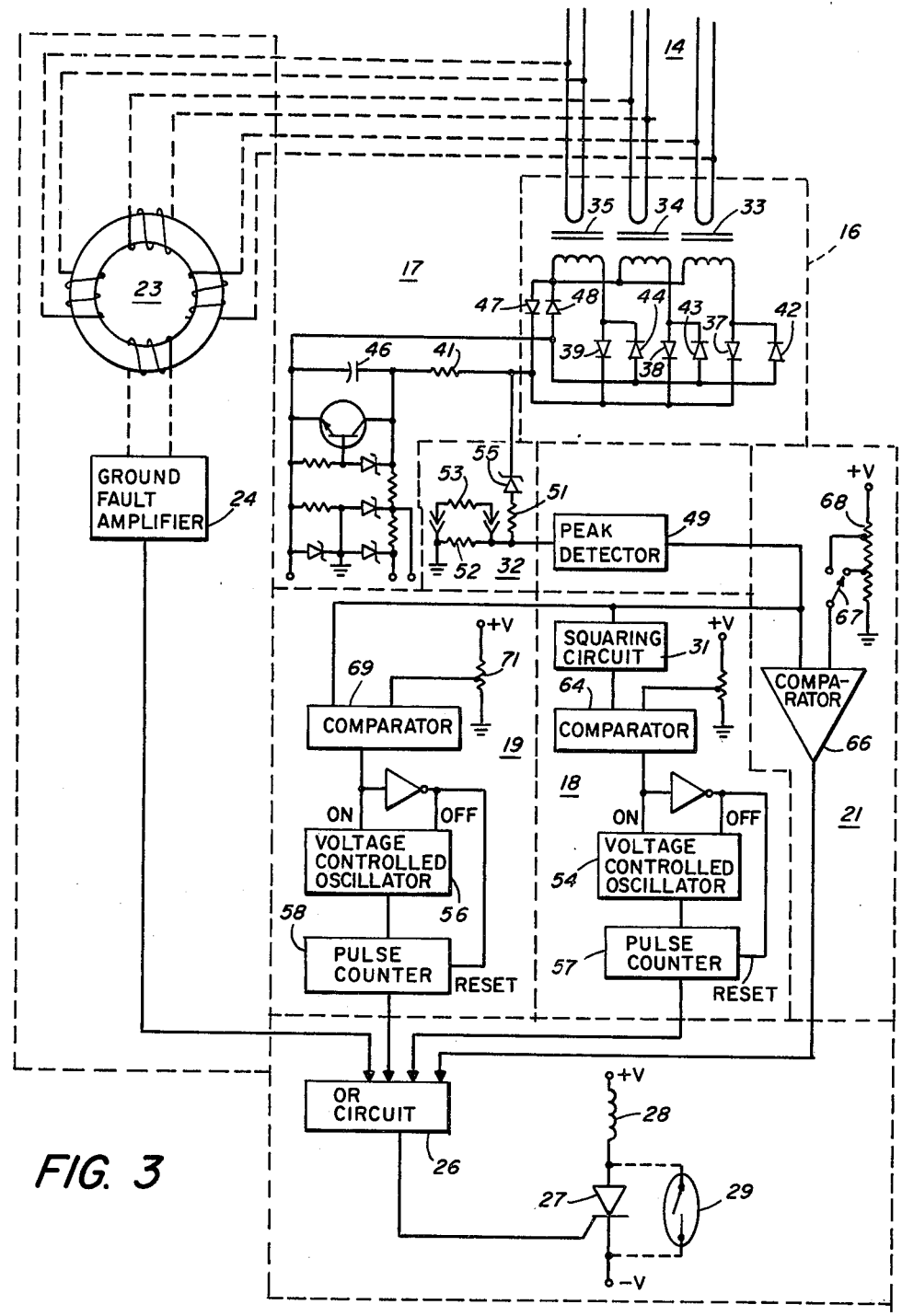
FIG. 3 is a partial block diagram of an embodiment of this invention with a dotted line optional portion added thereto.

Hybrid digital analog circuits for a solid state trip unit are shown in FIGS. 2 and 3. FIG. 3 illustrates more of the circuits in block diagram. Section 16 is part of the input stage and provides three (3) current transformers 33, 34, 35 for a three-phase, three-wire system. Load current, sensed by the current transformers 33, 34, 35, is fed to a full wave rectifying bridge, including diodes 37, 38, and 39 having their anodes coupled, respectively, to the secondary windings of the current transformers 33, 34, 35 and their cathodes coupled together to one terminal of a resistor 41. Diodes 42, 43, 44 have their cathodes coupled, respectively, to the anodes of the diodes 37, 38, 39, and have their respective anodes coupled together to one terminal of a capacitor 46, the other terminal of the capacitor 46 being coupled to the other terminal of the resistor 41. The remaining terminals of the secondary windings of the current transformers 33, 34, and 35 are joined together to an anode of the diode 47 whose cathode is coupled to the resistor 41, and such remaining terminals are also coupled to the cathode of the diode 48 whose anode is coupled to the capacitor 46. Thus, the ac signal, applied through the current transformers, is converted into a full wave rectified waveform.

The voltage developed across the resistor 41 and the capacitor 46 is proportional to the largest load current that is carried on three conductor busses. Therefore, the solid state trip unit responds to the most heavily loaded pole. Electrical energy, coupled through the current transformers, is fed to a power regulator 17 which provides power to the electronic circuits and to the quick response solenoid 28 in the output stage 13. Coincidentally, the sensed signal is conditioned in the ampere rating plug circuit 32 and is passed on to a peak detector 49. The output voltage of the peak detector 49 is then distributed to the long term delay circuit 18, the instantaneous trip circuit 21, and to the short term delay circuit 19.

Referring more particularly to FIG. 2, the ampere rating plug 32 contains one or more fixed resistors, or a potentiometer for continuously adjustable ratings, to select the trip current rating of the breaker (as desired within the established minimum to maximum current range). The ampere rating plug 32 is a relatively inexpensive component so as to permit the manufacture and stocking of otherwise identical breakers which can be customized, or set, to any desired current rating either in the factory or in the field and either at the time of the original circuit breaker installation, or at a later time, merely by installing the proper rating plug. In this manner, the expensive processes of manufacturing and stocking a large number of differently rated breakers, and the necessity of changing an entire breaker to accommodate wiring changes after the initial installation can be avoided merely by stocking a large number of the inexpensive rating plugs.

A schematic diagram of the ampere rating plug 32 is shown both in the FIG. 2 and FIG. 3. The ampere rating plug 32 includes a resistor 51 in series with a permanent shunt resistor 52 together with a zener diode 55 whose cathode is coupled to the resistor 41. The minimum setting is established by the series resistor 51 and the permanent shunt resistor 52. The ampere rating plug 32 contains one or more resistors shown collectively as 53 which are connected in parallel with the shunt resistor 52. As the equivalent parallel resistance of the resistors 52, 53 decreases, a larger input voltage is required to effect the standard output voltage from the network to the input of the peak detector 49. When current passing through the breaker causes the voltage at the junction of the resistors 51 and 52 to achieve this "standard voltage", the electronic processor 12 causes the breaker to trip, as described hereinafter. From the foregoing, it is seen that by decreasing the resistance of the rating plug 53, the rating of the breaker is increased. Conversely, increasing the resistance of the resistor 53 decreases the current which causes the breaker to trip. In the limit, by increasing the resistance 53 to infinity, such as would occur when the plug is removed, or is not firmly seated in its receptacle, or if it were to fail to open due to mechanical damage or other cause of failure, the breaker rating reverts automatically to its lowest possible rating. Such characteristic is a distinct advantage in assuring a safe operation.

A three pin plug can be utilized for the ampere rating plug 32 for mounting the resistor 53 (or several resistors, or potentiometer, of the desired rating) and thereby provide suitable physical protection. A multi-pronged receptacle can accommodate the rating plug and permit connection of a multi-conductor cable from a testing device for other purposes, as desired. The ampere rating plug 32 determines the standard voltage level at which the trip process takes place, and provides other advantages, such as testing accommodation.

The output of the ampere rating plug 32, obtained from the junction of the resistors 51, 52, 53 is applied to the peak detector 49 which provides an output voltage that approximates the true peak value of the signal applied thereto.

Referring to FIG. 3, the long term delay circuit 18 and the short term delay circuit 19 each contain an independent voltage controlled oscillator 54, 56, respectively, the respective outputs of which are coupled to clock a pulse counter 57, 58, respectively. Non-integrating reset circuits 59, 61, as depicted in FIG. 2, are coupled to the long term delay circuit 18 and short term delay circuit 19, respectively. For the long term delay circuit 18, it is desired that the delay time follow the $I^2t$ relationship. Preferably, a broad, dynamic range, voltage controlled oscillator 54 is preceded by a squaring circuit 31 for achievement of the current squared characteristic. An operational transconductance amplifier 62 can function as the squaring circuit 31, as depicted in FIG. 2. In order to provide an impedance match between the output of the squarer 62 and the input of the voltage controlled oscillator 54, a high impedance, unit gain inverter 63 is employed. The sensed signal, which is an indication of the largest load current, processed by the squarer 31, is then fed to the voltage controlled oscillator 54 and a comparator 64. The comparator 64 compares the input signal with preset pick-up reference voltage and turns "on" the voltage controlled oscillator 54 when the input signal exceeds a reference voltage. The comparator 64 turns "off" the voltage controlled oscillator 54 when the input signal is below the reference voltage, and resets the counter 57 for non-integration of the previous current history. At a predetermined value, the processor 12 signals the breaker to trip. The voltage controlled oscillator 54 increases linearly in frequency with the applied control voltage which represents either the current level (short term), or the square of the current level (long term), that is sensed. Thus, the predetermined trip count is achieved faster for higher currents, and enables precise control of the various time delays that are required.

The instantaneous trip circuit 21 includes a threshold detection circuit or comparator 66. As depicted in FIG. 3, the output of the detector 49 is compared with the reference voltage obtained by means of a switch 67 across either one of two taps on a resistance 68 which is coupled between a point of reference potential and ground. The sensed current level, from the output of the peak detector 49, is thus compared by the threshold detector 66 with one of several selectable preset threshold values. The output of the threshold detector 66 feeds directly to the OR gate 26 of the output stage to minimize the time delay and to permit immediate trip at the present ampere rating of the circuit breaker. The output of the peak detector 49 is coupled to one input of the comparator 66. The other input of the comparator 66 is coupled via a switch 67 to one of two taps on a resistor 68 which is coupled across the voltage potential +V and a point of reference potential, such as ground. However, a continuously adjustable threshold setting, which determines when the instantaneous trip is activated, can be achieved by replacing the fixed valued resistor 68 with a potentiometer. As soon as the signal reaches the threshold level, this threshold detector 66 signals the output stage 13 to interrupt the load current.

For the short term delay circuit 19, the signal from the peak detector 49 is processed by coupling to one input of a comparator 69, the other input being coupled to a tap on a resistor 71 which is coupled across a voltage source. The output of the comparator 69 is coupled to the voltage controlled oscillator 56. The output frequency of the short term voltage controlled oscillator 56 increases directly with the increase of the sensed load current. When a predetermined number of pulses are counted by the counter 58, the OR circuit 26 is signaled to trip the breaker, thus achieving the desired inverse linear current time characteristics.

As depicted in FIG. 1, a thermal sensor 22 can be coupled as an input to the OR gate 26 to signal the circuit breaker to trip when the temperature rises to a point where damage may occur. Alternatively, a thermal switch 29 can be provided across the silicon controlled rectifier 27 to signal the circuit breaker to trip when the internal temperature rises to the point where damage to electronic components may occur. Optionally, a temperature dependent resistor 29 or a thermal sensor 22 can be used.

The output stage 13, as depicted in FIG. 2, can include the OR gate 26 which typically includes a plurality of diodes coupled together at common electrodes thereof. A thermal sensor 29 (FIG. 1) or a thermal dependent resistor 81 is applied as one resistor in a four resistance balance network applied to a comparator 82, the output of the comparator 82 being coupled to the gate of the silicon controlled rectifier 27. The output stage 13 further includes silicon controlled rectifier 27 and the quick response solenoid 28. The silicon controlled rectifier 27 is normally in a non-conduction state; hence, no current flows through the solenoid coil 28 to energize the quick response solenoid. As soon as a trip signal is received by the OR gate 26, the OR gate 26 causes the silicon controlled rectifier 27 to conduct, which, in turn, draws a current or current pulse through the solenoid coil 28 causing the quick response solenoid to release the latching mechanism and to open the breaker contacts. Concurrently, the output stage 13 provides a signal to reset all the electronic counters 83, 84 via a diode 86 which is coupled from the output of the comparator 82 and applied to respective gates 59, 61 to reset the counters 83, 84, thereby resetting the system, making it ready for the next operation. The OR gate 26 inputs includes a long term delay signal, a short term delay signal, the instantaneous trip signal, and the over-temperature signal. A ground fault tripping signal can also be implemented in this design, as depicted in FIGS. 1 and 3. A voltage +V is applied across a resistor-capacitor-resistor circuit 60 having a capacitor-resistor junction coupled to an input of the gates 59, 61 to provide a resetting signal so that the counters 83, 84 efficiently perform during the transition period.

The foregoing invention has numerous advantages: first, it is a digital system which possesses inherently high immunity to electrical noise. Hence, the system is less sensitive in a noisy environment. Second, it is an all solid state electronic control, wherein advantages are high reliability and precise time control, thereby providing for better coordination with downstream breakers. Third, it is versatile. The system covers a very broad range of ampere ratings, for example, from 400 amperes nominal to 1200 amperes nominal, and higher if desired. Fourth, it is cost-effective to manufacture because it requires little energy to operate and is easy to adjust. Fifth, with the thermal sensor, the system is protected from thermal runaway. Sixth, it has a long term delay, a short term delay, instantaneous trip, and can have ground fault trip protection. Various time delays can be implemented for any particular application.

Various modifications can be performed without departing from the spirit and scope of this invention. For example, for double protection against possible malfunction caused by overheating, an integrated circuit protector, which is normally an open thermal switch, can be installed directly across the anode and cathode of the silicon controlled rectifier 27.

What is claimed is:

1. An improved circuit breaker including a solenoid for actuation in an event of an electrical overload, wherein the improvement comprises
   means for sensing current through an electrical circuit subject to interruption by said circuit breaker in the event of an electrical overload;
   means for converting the sensed current to a voltage proportional thereto;

means for detecting an excess of said proportional voltage over a predetermined voltage;

means for squaring the excess of said proportional voltage;

voltage controlled oscillator means responsive to the squared excess voltage for providing signals during a presence of said excess voltage; and means for counting said signals, and, upon reaching a predetermined count, actuating said solenoid.

2. An improved circuit breaker including a solenoid for actuation in an event of an electrical overload, wherein the improvement comprises means for sensing current through an electrical circuit subject to interruption by said circuit breaker in the event of an electrical overload;

means for converting the sensed current to a voltage proportional thereto;

a current rating plug and receptacle system responsive to said proportional voltage for providing a standardized voltage therefrom, said proportional voltage being applied across a first resistor in series with a parallel connection of a permanent shunt resistor and a replaceable plug resistor, and said standardized voltage being provided across said parallel connection;

a peak detector coupled to receive said standardized voltage for providing a voltage which approximates a true peak value of said standardized voltage;

instantaneous trip circuit means, including threshold detection means, for comparing the approximate peak value voltage with a preset threshold value and, when said approximate peak value equals or exceeds said preset threshold value, providing a trip signal therefrom;

long term delay circuit means including squaring circuit means coupled to square the approximate peak value voltage from said peak detector, comparator means coupled to compare the squared approximate peak value voltage with a reference voltage, a voltage controlled oscillator coupled to said comparator means responsive to a signal applied to said voltage controlled oscillator when said squared approximate peak value voltage exceeds said reference voltage, and a pulse counter coupled to said voltage controlled oscillator for providing a trip signal therefrom when said pulse counter achieves a predetermined count, said pulse counter being reset when said squared approximate peak value voltage ceases to exceed said reference voltage;

short term delay circuit means including comparator means coupled to compare the approximate peak value voltage with a reference voltage, a voltage controlled oscillator coupled to said short term delay comparator means responsive to a signal applied to said short term delay voltage controlled oscillator when said approximate peak value voltage exceeds said short term delay reference voltage, and a pulse counter coupled to said short term delay voltage controlled oscillator for providing a trip signal therefrom when said short term delay pulse counter achieves a predetermined count, said short term delay pulse counter being reset when said approximate peak value voltage ceases to exceed said reference voltage;

an OR circuit for providing a control signal upon the presence of any trip signal applied thereto; and a solid state circuit for coupling said solenoid to a power source, said solid state circuit being actuated by said control signal.

3. The circuit breaker as recited in claim 2 further comprising means responsive to said current sensing means for detecting a ground fault connection, and, in such event, providing a trip signal therefrom.

4. The circuit breaker as recited in claim 2 further comprising a thermal switch coupled across said solid state circuit.

5. An improved circuit breaker including a solenoid for actuation in an event of an electrical overload, wherein the improvement comprises means for sensing current through an electrical circuit subject to interruption by said circuit breaker in the event of an electrical overload;

means for converting the sensed current to a voltage proportional thereto, and for providing a supply voltage;

a current rating plug and receptacle system responsive to said proportional voltage for providing a standardized voltage therefrom, said proportional voltage being applied across a first resistor in series with a parallel connection of a permanent shunt resistor and a replaceable plug resistor, and said standardized voltage being provided across said parallel connection;

a peak detector coupled to receive said standardized voltage for providing a voltage which approximates a true peak value of said standardized voltage;

instantaneous trip circuit means, including threshold detection means, for comparing the approximate peak value voltage with a preset threshold value and, when said approximate peak value voltage equals or exceeds said preset threshold value, providing a trip signal therefrom;

long term delay circuit means including squaring circuit means coupled to square the approximate peak value voltage from said peak detector, comparator means coupled to compare the squared approximate peak value voltage with a reference voltage, a voltage controlled oscillator coupled to said comparator means responsive to a signal applied to said voltage controlled oscillator when said squared approximate peak value voltage exceeds said reference voltage, and a pulse counter coupled to said voltage controlled oscillator for providing a trip signal therefrom when said pulse counter achieves a predetermined count, said pulse counter being reset when said squared approximate peak value voltage ceases to exceed said reference voltage;

short term delay circuit means including comparator means coupled to compare the approximate peak value voltage with a reference voltage, a voltage controlled oscillator coupled to said short term delay comparator means responsive to a signal applied to said short term delay voltage controlled oscillator when said approximate peak value voltage exceeds said short term delay reference voltage, and a pulse counter coupled to said short term delay voltage controlled oscillator for providing a trip signal therefrom when said short term delay pulse counter achieves a predetermined count, said short term delay pulse counter being reset when said approximate peak value voltage ceases to exceed said reference voltage;

means responsive to said current sensing means for detecting a ground fault condition, and, in such event, providing a trip signal therefrom;

an OR circuit for providing a control signal upon the presence of any trip signal applied thereto;

a silicon controlled rectifier having a gate coupled to receive said control signal, an anode, and a cathode;

a thermal switch coupled across said anode and said cathode; and a serial connection including said anode, said cathode, and said solenoid across said supply voltage.

* * * * *